United States Patent [19]
Allen

[11] Patent Number: 5,232,134
[45] Date of Patent: Aug. 3, 1993

[54] BIKE CARRYING SYSTEM

[76] Inventor: Michael D. Allen, 3444 Regalia Rd., Salt Lake City, Utah 84121

[21] Appl. No.: 697,612

[22] Filed: May 9, 1991

[51] Int. Cl.$^5$ ............................................. B60R 9/00
[52] U.S. Cl. ........................... 224/42.43; 224/42.03 B; 224/42.07
[58] Field of Search ...................... 224/42.03 B, 42.07, 224/42.04, 42.43, 324; 211/22, 21, 20, 17

[56] References Cited

U.S. PATENT DOCUMENTS

| | | | |
|---|---|---|---|
| 3,757,975 | 9/1973 | Sneider | 224/42.03 B |
| 3,883,002 | 5/1975 | Moore | 211/21 |
| 4,813,584 | 3/1989 | Wiley | 224/42.03 B |
| 4,906,015 | 3/1990 | LaCroix et al. | 224/42.07 |
| 5,052,605 | 10/1991 | Johansson | 224/324 |

FOREIGN PATENT DOCUMENTS

| | | | |
|---|---|---|---|
| 3526243 | 2/1987 | Fed. Rep. of Germany | 224/42.03 B |
| 2182619 | 5/1987 | United Kingdom | 224/42.03 B |

*Primary Examiner*—Linda J. Sholl
*Attorney, Agent, or Firm*—Thorpe North & Western

[57] ABSTRACT

A system for carrying a plurality of bicycles behind a motorized vehicle comprising a frame which is coupleable to the motorized vehicle; a bottom plate integrally attached to the frame; and a plurality of elongate cantilevered arms attached at one end to the bottom plate and radially extending therefrom, each arm being equipped to carry a bicycle. Optimally, a lightweight bumper may be fastened to the unattached ends of the arms, the bumper including tail lights which are connected to and responsive to the tail light current of the vehicle to which the system is attached.

2 Claims, 3 Drawing Sheets

BIKE CARRYING SYSTEM

BACKGROUND OF THE INVENTION

1. Field

This invention relates generally to transportation of bicycles on motorized vehicles, and more specifically to a novel apparatus for safely carrying a plurality of bicycles behind a truck, van or other motorized vehicle such that the bicycles do not come in contact with each other.

2. Prior Art

A number of prior art devices are known which allow more than one bike to be temporarily attached to a motorized vehicle for transportation purposes. Perhaps the most popular of these is a device which is attached to the rear bumper and trunk of a standard passenger vehicle. The device has two or more horizontal bars which extend rearwardly and slightly upwardly from the device and the car to which it is attached. The bars may be curled upwardly at the free ends to prevent the bicycles from jarring loose during travel.

Generally, use of such a device requires merely lifting the bicycle and placing the crossbar over the two or more horizontal bars and resting it thereon. The bicycle remains in place by the force of gravity and usually comes in contact with the vehicle due to the position of the device and the slight upward orientation of the bars upon which the bicycle is riding.

Transporting only one bicycle by this method can cause scratches, chips, and dents in the vehicle since the bicycle is not always rigidly secured to the device and often swings about responsive to the wind when traveling.

This problem is compounded when more than one bicycle is transported because the bicycles are generally stacked next to each other and extending components such as handle-bars and peddles easily become intertangled. Thus, the vehicle to which this device is attached may become damaged as may the bicycles which ride upon this device.

While these problems associated with this device may be alleviated by use of a separate trailer, use of a separate vehicle also has its disadvantages. For example, most trailers are not equipped with an independent suspension system which protects the bicycles from bumps and jolts during travel. Further, an additional vehicle often combines with the lead vehicle to create an unmanageable length. Too great a length can result in difficult situations, such as finding appropriate parking places and backing up.

BRIEF SUMMARY AND OBJECTS OF THE INVENTION

A principal object of the present invention, therefore, is the provision of an improved apparatus and related method for loading and transporting a plurality of bicycles behind a motorized vehicle having the advantage of carrying the bicycles in a position in which they do not contact each other or the vehicle.

Another major object of this invention is to provide an improved apparatus and method for transporting bicycles behind a motorized vehicle wherein a separate vehicle is not used.

A further significant object is to provide an apparatus and method for transporting bicycles which is safe, economical, efficient, inexpensive to manufacture, and safe to use in virtually all contemplated circumstances.

Accordingly, the present invention comprises a frame coupled at a first end to a receiver-type trailer hitch on a motorized vehicle and rigidly attached to a bottom plate at the other end; a plurality of elongate arms extending radially from the bottom plate, each being fastened rigidly at one end to the bottom plate by a standard attachment system; and a fastening system for securing one bicycle to each elongate arm. The elongate arms may be reinforced by cross-braces spaced at appropriate intervals as needed. In fastening a bicycle on each arm, the front tire of the bicycle is removed.

The fastening system for securing the bicycles comprises a U-shaped bracket for receiving the rear bicycle tire, a strap securely fastening it thereto, and a bolt passing through each arm which has a nut on one end and a quick release head on the other end, the bolt for receiving and securing the front fork of the bicycle from which the front tire has been removed. Optionally, a lightweight bumper having operable tail lights, preferably including stop and turn signals, is attached to the free ends of the cantilevered arms.

In use, the invention is mounted to a vehicle such as a truck or a van having a hollow, tube-like, receiver-style hitch, by inserting the first end of the frame into the receiver and securing it with a pin. A bicycle is then placed on each cantilevered arm after removing the front wheel thereof. The rear wheel of the bicycle is placed in the U-shaped bracket and secured in place by the corresponding attached straps.

The front of the bicycle is properly positioned by placing the receiver notches, which usually secure the front wheel to the bicycle, over the provided bolt and adjusting the lever on the quick release head. Preferably, the rear of each bicycle is disposed closest to the transport vehicle, thus allowing the cantilevered arms to fan outwardly from the bottom plate to provide adequate space for the bicycles' handlebars.

BRIEF DESCRIPTION OF THE DRAWINGS

The above and other objects, features and advantages of the invention will become apparent from a consideration of the following detailed description presented in connection with the accompanied drawings in which.

DETAILED DESCRIPTION

Figure 1:
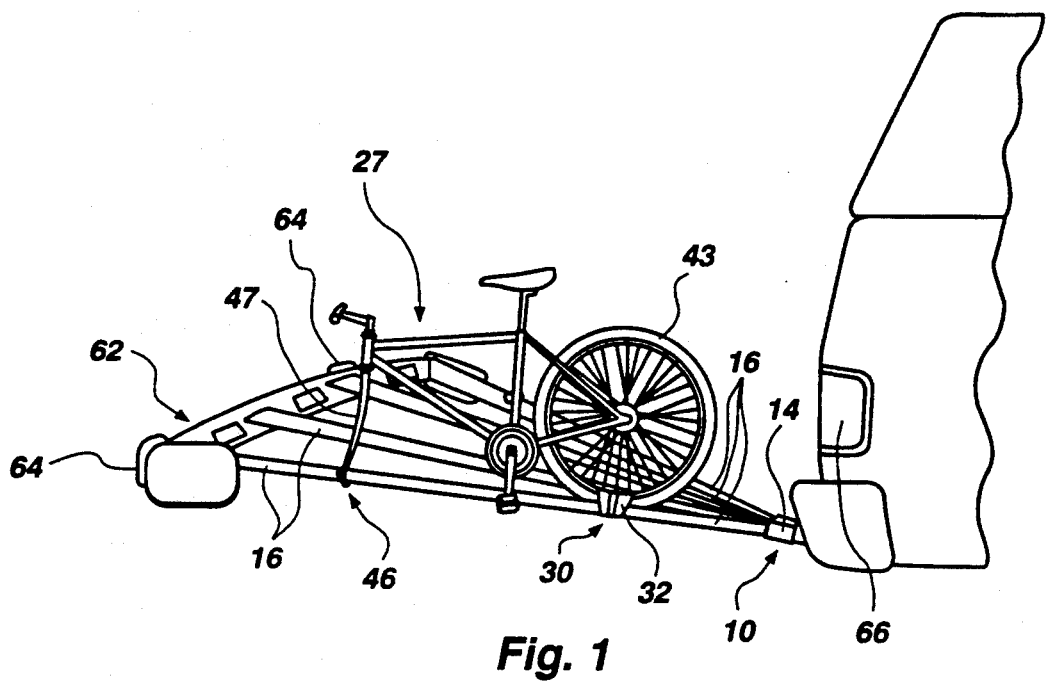
FIG. 1 is a perspective view, according to the present invention, of a preferred bicycle carrying system shown mounted to the rear of a motorized vehicle having only one bicycle mounted thereon.

Reference is now made to the drawings wherein like numerals are used to designate like components throughout. The apparatus of the present invention comprises generally an angled frame 10, a bottom plate 12, a top plate 14, and a plurality of elongate, cantilevered arms, each designated 16. Each of these components is hereinafter described in greater detail.

Frame 10 is preferably constructed of structural steel or like material and comprises an upper portion 18 and a lower portion 20. As best shown in FIG. 3, frame 10 has a somewhat angular shape. Lower portion 20 of frame 10 has a hollowed square cross-sectioned tube adapted to fit snugly into a standard receiver-type trailer hitch 22 mounted on the transporting motorized vehicle, best seen in FIGS. 2 and 3. Lower portion 20 has an aperture 24, which, when securing the device to hitch 22, must be aligned with a second aperture 23 to receive a standard pin (not shown) to prevent detachment.

Figure 4:
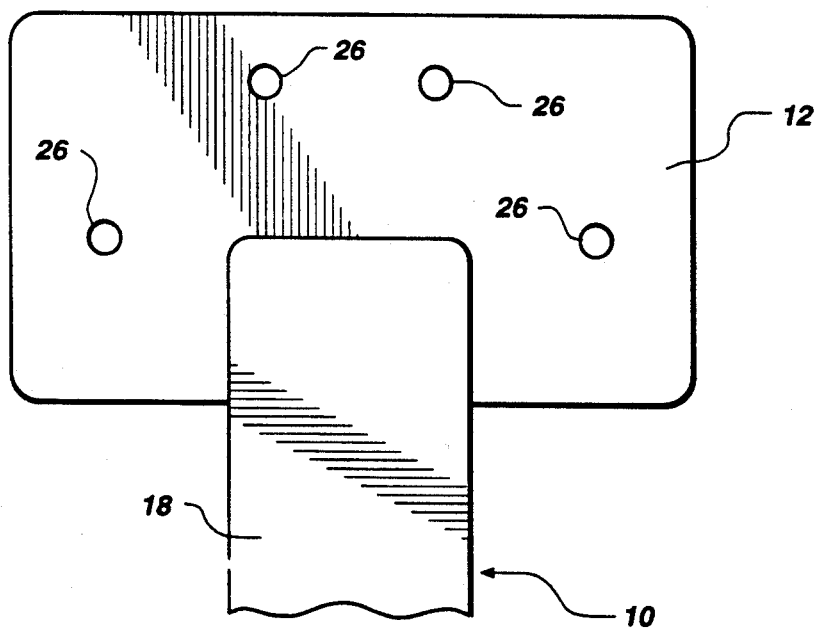
FIG. 4 is an enlarged, isolated bottom plan view of the bottom plate illustrating a preferred configuration of apertures through which bolts are passed to secure the elongate arms in place.

Upper portion 18 of frame 10 extends outwardly and upwardly from lower portion 20, upper portion 18 and lower portion 20 being integrally connected as by welding. Preferably, upper portion 18 is also integrally connected to bottom plate 12 as by welding. Bottom plate 12 is constructed of steel or a similar structural material, and comprises a plurality of apertures 26, each aperture serving the purpose of securing one of the elongate arms 16, hereinafter described. Thus, the number and configuration of apertures 26 is dependent upon the desired number and configuration of cantilevered lever arms 16 which are used. At present preference, the number and configuration of apertures shown in FIG. 4, i.e. eight, best implements the principles and objects of this invention.

Top plate 14 is parallel to and is of the same or similar construction as bottom plate 12, and comprises a matching configuration of apertures 28, aligned and corresponding to apertures 26 in bottom plate 12. Top plate 14, in conjunction with bottom plate 12, serves to secure each elongate arm 16 to the attached frame portion 10 in cantilever fashion, each arm being disposed at one end between the top plate 14 and the bottom plate 12 See FIG. 3. The elongate, cantilevered arms 16 are each mounted at a slight upwardly oriented angle to account for sag caused by the weight of the bicycle 27 mounted thereon.

Figure 2:
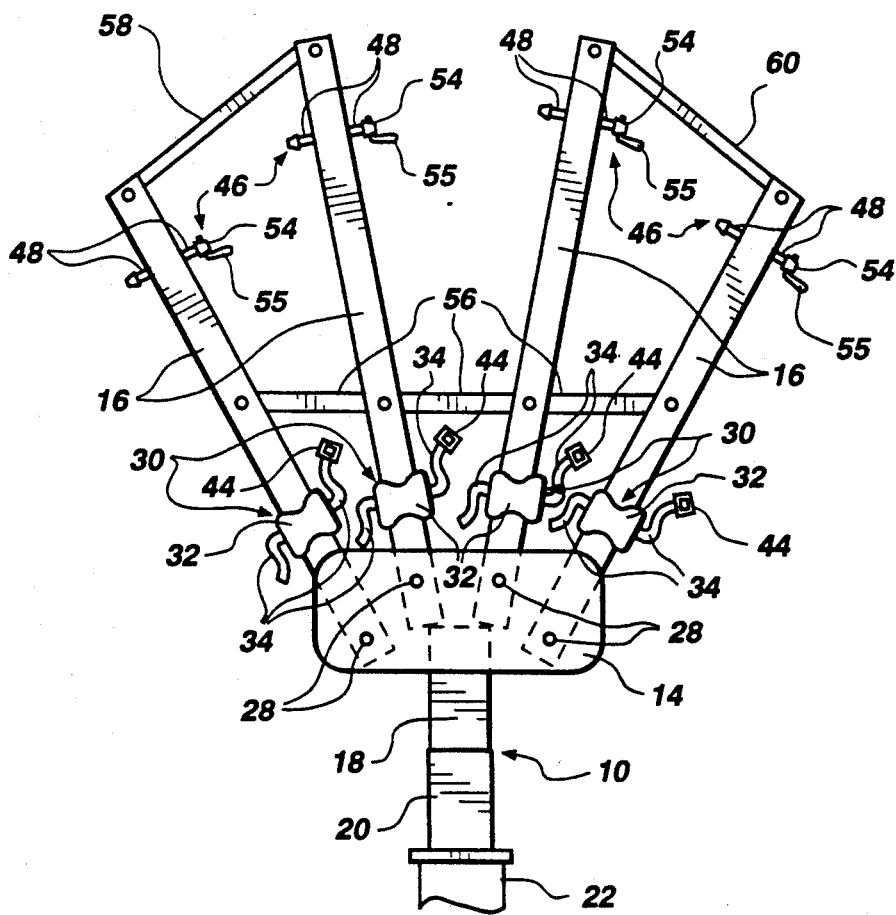
FIG. 2 is a top plan view of the invention of FIG. 1 illustrating the bicycle fastening system and cross-braces.
Figure 3:
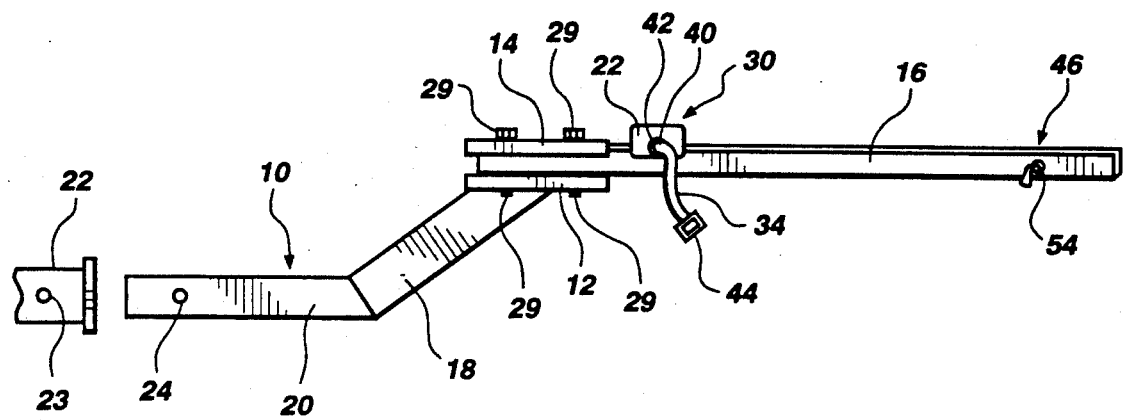
FIG. 3 is side elevational view of the invention of FIG. 1.

The preferred configuration of cantilevered arms 16 is illustrated in FIG. 2, wherein each arm is connected at one end to frame 10 by bolts 29 passing through top plate 14, arms 16 and bottom plate 12, the bolts being secured by nuts 31. Arms 16 extend radially from this point of attachment so that the handlebars of the bicycles 27 riding thereon do not come in contact when properly mounted.

Each of the cantilevered lever arms is identical to the others and thus only one need be described herein. Each arm 16 comprises preferably an elongated, square cross-sectioned piece of hollow aluminum tubing. As described, cantilevered arm 16 is attached at one end to frame 10, the opposing end being unattached to any support structure and thus cantilevered. At the end of cantilevered arm 16 nearest frame 10, an attachment assembly 30 for securing the rear wheel 43 of the bicycle 27 is attached, as best shown in FIG. 6.

Attachment assembly 30 comprises generally a U-shaped support bracket 32 and a plurality of attachment straps 34. As shown, support bracket 32 has two sections 36 and 38, the first section 36 for attachment of support bracket 32 to arm 16 and a U-shaped section 38 for receiving the rear tire of a bicycle. Section 36 fits snugly over cantilevered arm 16 and comprises an aperture (not shown) in each of the side wall portions 39 and 41. These apertures are aligned with corresponding apertures in arm 16 (also not shown) to receive a bolt 40 which is secured by a nut 42.

Figure 6:
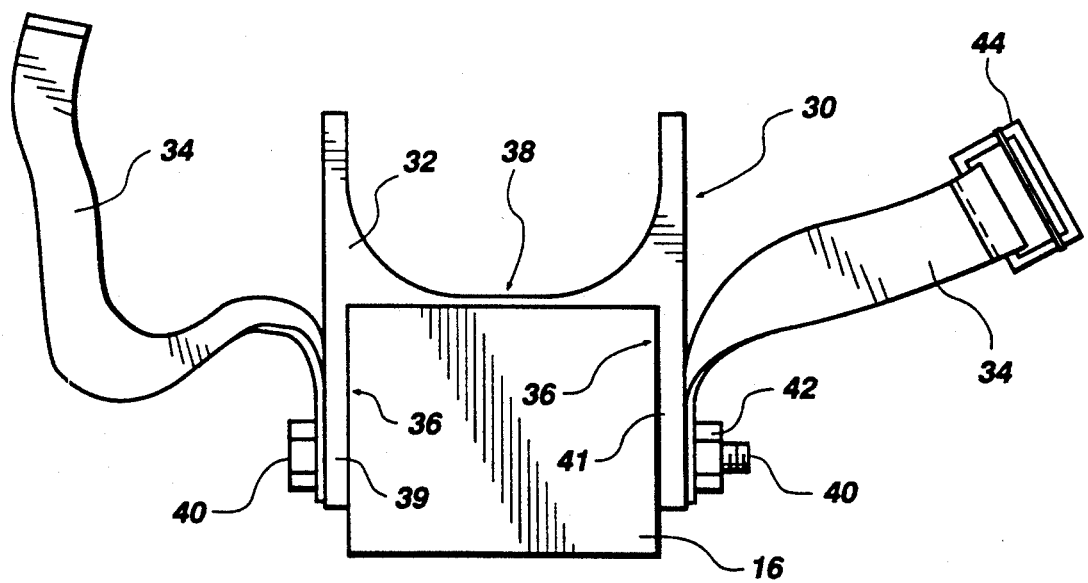
FIG. 6 is an isolated cutaway view of the U-shaped bracket and associated strap for securing the rear tire of the bicycle to the apparatus of this invention.

As best seen in FIG. 6, U-shaped section 38 has an upward orientation when mounted on cantilevered arm 16. This allows facile reception of a rear bicycle tire 43 which fits loosely in the open upwardly extending pocket portion of U-shaped section 38. The bicycle tire 43 is secured in U-shaped section 38 by the straps 34, each of which are secured at one end to support bracket 32 or to arm 16. FIG. 6 shows straps 34 attached to bracket 32 by bolt 40 and nut 42, although any number of known standard methods of attachment are contemplated.

In use, the unattached ends of straps 34 are threaded through the spokes of the rear bicycle tire 43 and secured together to prevent the tire 43 from becoming dislodged. Straps 34 may be secured by a buckle 44, as shown, or by another method such as with Velcro. Cantilevered arms 16 may have a series of apertures to receive bolt 40 and nut 42 to secure support bracket 32. Thus, attachment assembly 30 is adjustable to accommodate most any size of bicycle.

Figure 5:
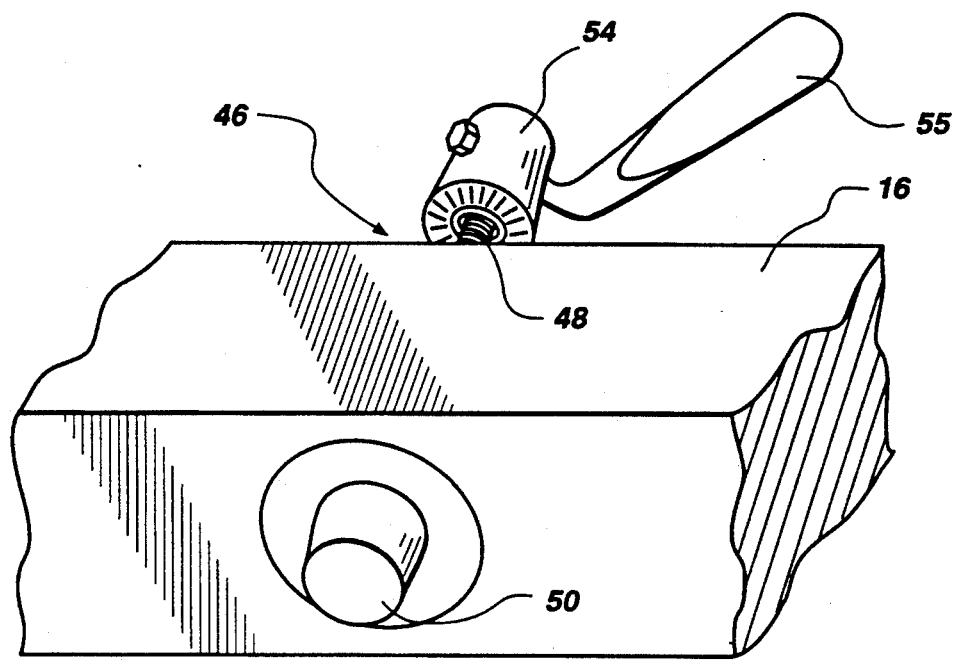
FIG. 5 is an enlarged perspective partial cutaway view of the bolt, associated nut and quick release head for securing the front end of a bicycle to the apparatus of this invention.

Arm 16 further comprises an attachment assembly 46 for securing the front fork 47 of the bicycle 27, best shown in FIG. 5. Assembly 46 comprises an aperture drilled or otherwise formed, through elongate arm 16 with a pin 48 securely mounted therein. On one end of pin 48 a nut 50 is rigidly mounted. On the other end of pin 48 a standard quick release head 54 is placed. In use, the front wheel of the bicycle 27 is removed and the receiving notches of the front fork 47 of the bicycle 27 are received by pin 48. Quick release head 54 is then adjusted and tightened with quick release lever 55 to securely attach the front fork 47 of the bicycle 27 to arm 16.

Preferably, the elongate, cantilevered arms 16 have appropriate cross-bracing to provide support, as best seen in FIG. 2, wherein a preferred arrangement of cross-bracing is shown. Of course, in the event that more or less than four arms 16 are used, the number and configuration of cross-bracing will change accordingly. FIG. 2 shows a cross brace 56 which connects and is attached to all four of the cantilevered arms 16 shown. Attachment of cross braces 56 and all other cross braces is by standard means such as a nut and bolt assembly. In this instance, cross brace 56 has appropriately drilled apertures as does each elongate arm 16, a nut (not shown) and a bolt (not shown) passing therethrough to form the attachment. Cross-braces 58 and 60 provide further support for cantilevered arms 16 and are attached in a similar manner.

Optionally, a lightweight bumper 62 may be fastened to the unattached ends of arms 16, as shown in FIG. 1. Preferably, bumper 62 has a lighting system including tail lights (not shown), which is connected to and responsive to the tail lights of the transporting vehicle so that braking and turn signaling functions are transmitted to bumper 62 for safety purposes.

It is to be understood that the above described arrangements are only illustrative of the application of the principles of the present invention. Numerous modifications and alternative arrangements may be devises by those skilled in the art without departing from the spirit and scope of the present invention and the appended claims are intended to cover such modifications and arrangements.

What is claimed is:

1. An apparatus for transporting bicycles behind motorized vehicles with receiver-type hitches comprising:

a frame comprising a first end having coupling means for connecting the frame to the hitch of a motorized vehicle, and a second end projecting rearwardly of the hitch, a bottom plate attached to the second end of the frame, a plurality of elongate arms, each having first and second ends, extending radially rearwardly from the bottom plate, attachment means for rigidly connecting the first end of each elongate arm to the bottom plate so that the second end of said each arm extends rearwardly in a cantilevered fashion from the bottom plate, and fastening means for selectively securing a bicycle to each elongate arm;

wherein the attachment means comprises a top plate disposed generally parallel to the bottom plate, said first end of the elongate arms being disposed between the top and bottom plates, and bolts passing through the top plate, the first end of the elongate arms, and bottom plate, and nuts securing the bolts in place.

2. An apparatus according to claim 1, wherein the fastening means comprises a plurality of rear attachment assemblies, each for securing a respective rear wheel of a bicycle, and each comprising a U-shaped support bracket mounted on a respective elongate arm for receiving the rear wheel of a bicycle, and a strap connected to the support bracket and threadable through the spokes of the rear wheel of the bicycle to secure the rear wheel to the support bracket, and a plurality of front attachment assemblies, each for securing a respective front fork of a bicycle, and each comprising a pin mounted in a respective elongate arm near the second end thereof for receiving the front fork of a bicycle, said pin including a nut rigidly mounted on one end of the pin, and a quick release head means disposable at the other end of the pin.

* * * * *